Sept. 15, 1964  E. L. WHEELER  3,149,322
ENCODER
Filed March 11, 1960  6 Sheets-Sheet 1
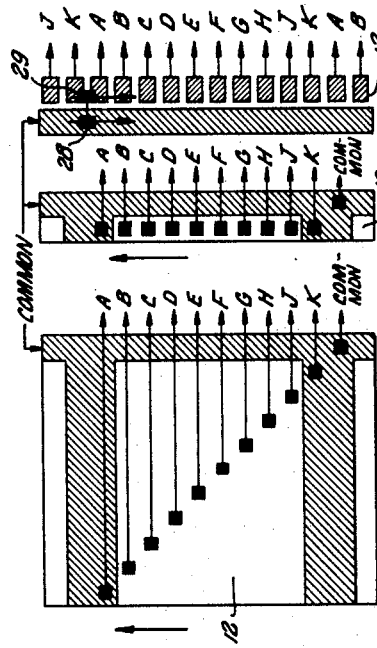
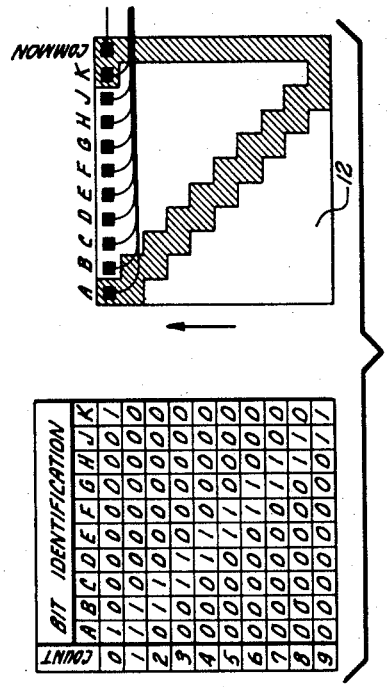
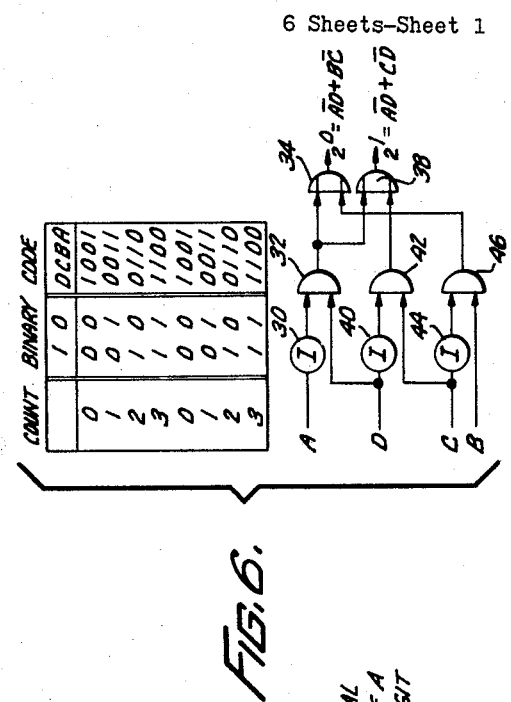
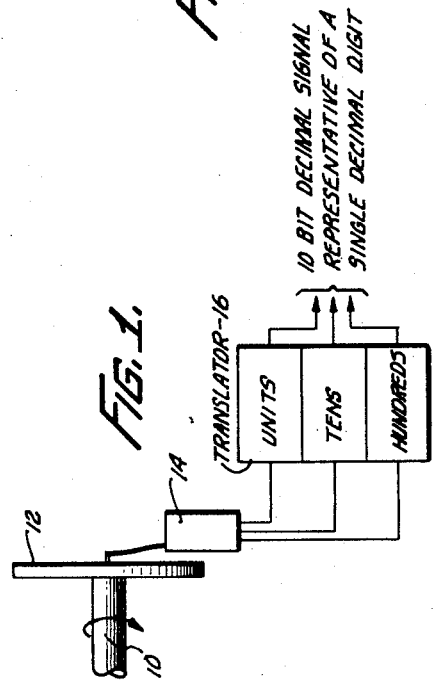
INVENTOR.
*Edwin L. Wheeler*
BY
*Christie, Parker & Hale*
ATTORNEYS Sept. 15, 1964   E. L. WHEELER   3,149,322
ENCODER
Filed March 11, 1960   6 Sheets-Sheet 2

INVENTOR.
EDWIN L. WHEELER
BY
ATTORNEYS

Sept. 15, 1964  E. L. WHEELER  3,149,322
ENCODER

Filed March 11, 1960  6 Sheets-Sheet 5

INVENTOR.
EDWIN L. WHEELER
BY
ATTORNEYS.

3,149,322
ENCODER
Edwin L. Wheeler, West Covina, Calif., assignor to Datex Corporation, Monrovia, Calif., a corporation of California
Filed Mar. 11, 1960, Ser. No. 14,306
10 Claims. (Cl. 340—347)

This invention relates to analog to digital converters and more particularly to encoders or shaft position digitizers.

A form of analog to digital converter that has been widely employed on a commercial basis is the encoder for providing digital indications of the positions of a shaft. Encoding in this fashion requires an element having a preselected pattern of binary characters representative of a unique shaft position, means for sensing the pattern of characters and means for providing relative movement between the element and sensing means in accordance with the shaft movement to provide electrical indications identifying the position of the shaft. Spatial encoding in this fashion is limited in resolution for any given set and type of sensng elements, elements to be sensed and the size of the disc, drum, plate, or mask having the pattern of binary characters recorded thereon. Limitations in resolution results in presently known encoders since both edges of the sensing element and the element to be sensed or binary character are used to define the boundary lines of a count or decimal digit. In the brush commutator type of encoder, for example, the width of the brush, the edge tolerances on both edges of the segments or binary characters and the manner in which the brush seats on the encoder disc all combine to limit the resolution and encoding accuracy. Another restriction on resolution for a given encoder disc size is the width of conducting and nonconducting segments. For a given brush width the nonconducting segment must be at least as wide as the brush plus sufficient allowance to prevent the brush bridging between conducting segments.

This invention provides an improved and more accurate analog to digital converter of the encoder or shaft position type which overcomes the resolution problems mentioned hereinabove. The shaft position digitizer or encoder of this invention is provided with an element or commutator prepared with a novel pattern of binary characters that will allow the resolution to be doubled relative to encoders as presently known and available. More specifically, for a given size commutator element the resolution may be increased by a factor of two or for a given resolution the size of the commutator element may be reduced by a factor of two. These results are possible since the pattern for the commutator segment is defined whereby a significant change in encoder output is produced only when the sensing element or brushes traverse the leading edge of a segment when the shaft to be digitized turns clockwise or the sensing element or brushes traverse a trailing edge when the shaft to be digitized is being turned counterclockwise. This eliminates any affect due to the brush width and also eliminates the problem of bridging of the segments by any one brush.

The pattern for the commutator element or encoder disc is defined to allow a plurality of binary characters of different kinds arranged in a preselected fashion to represent the different values in any convenient number system. Each value is represented by the same number of binary characters grouped to include a unique series of successive binary characters and which series includes at least one binary character continually changing in the same direction from one kind to the other kind in progressing between different values. In one embodiment of the invention the unique series begins with a binary character of one kind and ends with a binary character of the other kind and with the first and last of said binary characters of each series changing in opposite directions in progressing between the successive decimal digits. In progressing between successive decimal digits, transition codes may be generated as well as the desired code due to the normal manufacturing tolerances involved in encoder construction. These transition codes, however, in accordance with the present invention, provide essentially the same series of successive binary characters for each possible transition code, that is, the desired code and the transition code will have the same binary charcters generated in the same position for the next successive value.

The translating means for indicating the sensed decimal digit is connected to be responsive to the electrical binary characters delivered by the sensing means to provide an electrical indication of the value representing the new shaft position. The translating means includes means that are simultaneously responsive to at least the last of the binary characters of the unique series and the adjacent binary character of the series and which pair of characters includes the one binary character characteristic of the received value. Since the translating means is responsive only to the coincidence of the binary characters required for defining the values or counts, the remainder of the binary characters are redundant.

The plurality of binary characters are arranged on the communtator element in accordance with the patterns disclosed by this invention in a plurality of tracks representing the different orders for each value. The pattern and sensing means are defined relative to one another to generate a plurality of binary characters to include the abovementioned series. To this end the sensing elements may be aligned transverse to the direction of relative movement with the pattern arranged diagonally across the track. In this fashion, each count is represented by the unique combination of binary characters which are successively presented to the sensing elements. Alternatively, the pattern may comprise the alternate arrangement of binary characters each having a preselected length and transversely aligned on the disc with the sensing elements arranged diagonally with respect to the pattern. The sensing elements are spaced apart a distance of one value or count to provide the same pattern of characters as when the binary characters are diagonally arranged.

In still another embodiment of the invention, the same pattern of binary characters may be generated from a single track having the alternative arrangement of binary characters defined of a width on the order of the width of a single track and through the provision of a plurality of sensing elements aligned in the direction of relative movement of the disc and sensing elements to successively sense the binary characters. This same width single track arrangement may employ a single sensing element arranged to successively sense a plurality of separate or electrically isolated binary characters and produce the desired pattern of binary characters.

The patterns disclosed for generating the pattern of binary characters delivered to the translating means may be employed to define the values of any number system by means of seven or ten binary characters or by means of binary coding.

These and other features of the present invention may be more fully appreciated when considered in the light of the following specification and drawings, in which:

FIG. 1 is a schematic representation of an encoder embodying the invention;

FIGS. 3A to 3D are schematic representations of encoder patterns and associated sensing elements for representing the code shown in the accompanying chart;

FIG. 6 is a translating circuit for the binary coded-decimal digits of the hundreds order encoded in accordance with the invention;

Figure 2:
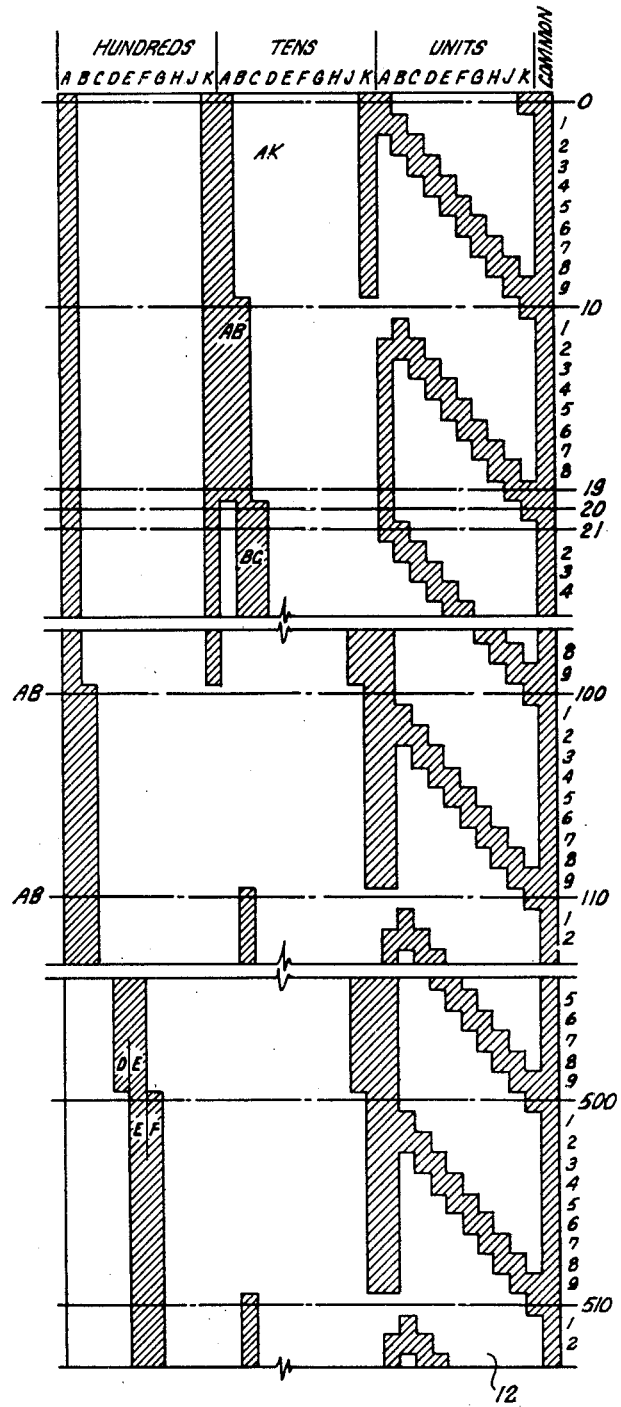
FIG. 2 is a developed view of portions of the tracks recorded on an encoder disc in accordance with the invention.

Now, referring to the drawings, the invention will be described in more detail. The analog information to be digitized is represented by the position of a rotating shaft 10. The shaft 10 in this instance is shown as mounting an encoder disc or commutator segment 12, rotatable therewith. The encoder disc 12 is provided with a pattern of binary characters, as is conventional practice, to provide a unique count for a predetermined number of shaft positions which may be one thousand, for example. Associated with the disc 12 is the sensing means, shown as the brushes 14 engaging the disc 12 for providing an electrical indication corresponding to the sensed binary characters. The electrical indications sensed by the brushes 14 are delivered to the translating unit 16. The encoder disc 12 is arranged with a plurality of tracks to represent in this instance the different decimal orders. In the same fashion, the translator 16 comprises a corresponding plurality of translating units to indicate the sensed decimal digits for each decimal order. For example, if the encoder disc is arranged to provide decimal indications of one thousand discrete shaft positions, the translator 16 will have separate translating circuits responsive to the sensed patterns for indicating the hundreds, tens and units digit. The output of the translator 16 will be in terms of a unique signal in a group of ten to represent the different decimal digits in each decimal order when a direct decimal output indication is desired.

The above table discloses a code comprising ten binary characters or bits which embodies the invention and which code may be termed a two out of ten or bistrophic code since two changes occur in transversing from one decimal digit to the next decimal digit. For the purposes of this invention, the generic nature of the code may be defined in terms of a unique series of binary characters having a different relative position for each decimal digit. The unique series of binary characters begins with a binary character of one kind and ends with a binary character of the other kind.

This unique series can be better appreciated by examining the units column in Table I. The unique series comprises the binary characters 110 arranged in a different relative position in the combination of ten characters or bits for each decimal digit. The decimal digit zero is characterized by the elements KAB arranged in that order and which elements represent the unique series of binary characters 110. This same series, 110, for the decimal digit one is represented by the characters ABC. The decimal digit two is identified by the unique series BCD, while the decimal digit three is correspondingly identified by the series CDE, et cetera. It will be noted that in each instance for each decimal digit the unique series begins with a binary character of one kind, in this instance a binary one, and ends with a binary character of the other kind, or a zero. Furthermore, in traversing from one decimal digit to the other, the first and last binary characters of the unique series change in opposite directions. As noted hereinabove, in traversing from the decimal digit zero to the decimal digit one, the element K changes from one to zero, while the element B changes from zero to one, whereby the series changes from elements KAB to the elements ABC. In the same fashion, in going from the decimal digit one to the decimal digit two, the element A changes from one to zero while the element C changes from zero to one so that the series changes from ABC to BCD. Also, in going from the decimal digit nine to the decimal digit (1)0, the J element changes from one to zero, and the A element changes from zero to one to produce a series change from JKA to KAB. These same changes occur in the same fashion for the remaining decimal digits. It should now be appreciated that any one deimal digit is characterized by the position of the last binary character of the unique series and the next adjacent binary character of the series. As will become more evident hereinafter, it will only be necessary to detect these two binary characters in each series to provide the necessary indication of the sensed decimal digit for a pattern recorded in terms of such a code.

Due to the normal manufacturing tolerances and mechanical inaccuracies involved in encoder construction, if

*Table I*

| Decimal Digit | Sensing Elements | | |
|---|---|---|---|
| | Hundreds<br>A, BCD, EFG, HJK | Tens<br>A, BCD, EFG, HJK | Units<br>A, BCD, EFG, HJK |
| 0 | 1, 000, 000, 001 | 1, 000, 000, 001 | 1, 000, 000, 001 |
| 1 | | | 1, 100, 000, 000 |
| 2 | | | 0, 110, 000, 000 |
| 3 | | | 0, 011, 000, 000 |
| 4 | | | 0, 001, 100, 000 |
| 5 | | | 0, 000, 110, 000 |
| 6 | | | 0, 000, 011, 000 |
| 7 | | | 0, 000, 001, 100 |
| 8 | | | 0, 000, 000, 110 |
| 9 | | | 0, 000, 000, 011 |
| 10 | | 1, 100, 000, 000 | 1, 000, 000, 001 |
| 19 | | 1, 100, 000, 000 | 0, 000, 000, 011 |
| 20 | | 0, 110, 000, 000 | 1, 000, 000, 001 |
| 21 | | | 1, 100, 000, 000 |
| 29 | | | 0, 000, 000, 011 |
| 30 | | 0, 011, 000, 000 | 1, 000, 000, 001 |
| 100 | 1, 100, 000, 000 | 1, 000, 000, 001 | 1, 000, 000, 001 |
| 500 | 0, 000, 110, 000 | 1, 000, 000, 001 | 1, 000, 000, 001 | an encoder is provided with the pattern of binary characters shown in Table I, it is possible that in transversing from one decimal digit to the next the pattern of binary characters generated will not always be that shown in Table I since one or more brushes may change before the others in response to slight shaft movements. As a result, if the pattern of Table I is utilized, the patterns shown in Table II may be generated in stepping from one decimal digit to the next.

*Table II*

| Decimal Digit | Sensing Elements | |
|---|---|---|
| | 1 out of 10 A, BCD, EFG, H JK | 3 out of 10 A, BCD, EFG, H JK |
| 0 | 1, 0 0 0, 0 0 0, 0 0 0 | 1, 0 0 0, 0 0 0, 0 1 1 |
| 1 | 0, 1 0 0, 0 0 0, 0 0 0 | 1, 1 0 0, 0 0 0, 0 0 1 |
| 2 | 0, 0 1 0, 0 0 0, 0 0 0 | 1, 1 1 0, 0 0 0, 0 0 0 |
| 3 | 0, 0 0 1, 0 0 0, 0 0 0 | 0, 1 1 1, 0 0 0, 0 0 0 |
| 4 | 0, 0 0 0, 1 0 0, 0 0 0 | 0, 0 1 1, 1 0 0, 0 0 0 |
| 5 | 0, 0 0 0, 0 1 0, 0 0 0 | 0, 0 0 1, 1 1 0, 0 0 0 |
| 6 | 0, 0 0 0, 0 0 1, 0 0 0 | 0, 0 0 0, 1 1 1, 0 0 0 |
| 7 | 0, 0 0 0, 0 0 0, 1 0 0 | 0, 0 0 0, 0 1 1, 1 0 0 |
| 8 | 0, 0 0 0, 0 0 0, 0 1 0 | 0, 0 0 0, 0 0 1, 1 1 0 |
| 9 | 0, 0 0 0, 0 0 0, 0 0 1 | 0, 0 0 0, 0 0 0, 1 1 1 |

These possible codes that may be generated may be termed transition codes and are the codes that are possible when the two out of ten code of Table I is utilized. In the same fashion, these codes may be termed three out of ten or one out of ten codes. The three out of ten transition code may be generated, for example, when the encoder shifts from the decimal digit one to the decimal digit two, by not only causing the changes in the B and C elements in accordance with the two out of ten code, but the movement is such that instead of the A element changing from a one to zero it remains in the one state. In the same fashion, the one out of ten code may be generated during this interval by the fact that the configuration for the two out of ten code is generated except that the B element does not remain in the one state but changes to the zero state. In each instance, however, it will be seen that a unique series is generated and which series begins with a binary character of one kind and ends with a binary character of a different kind as defined hereinabove. For example in the three out of ten code the unique series for the decimal digit one is represented by the KABC elements, while the unique series for the one out of ten code is defined by the BC elements alone. This digit in the two out of ten code is represented by the series ABC. The common elements in each of these codes is that the BC elements are respectively 1 and 0. For the decimal digit two, for example, the elements C and D represent the binary characters one and zero in that order in each series of each code. In each instance, then, for any one of the codes shown in the Tables I and II the decimal digit is characterized by the same pair of binary characters regardless of the number of characters in the series. Furthermore, this pair of binary characters for each code is the last character and the adjacent character of the unique series. The fact that a transition pattern is generated rather than the recorded pattern is not recognized by the translator 16.

Broadly, then, the decimal digits may be identified in the same progressive fashion whereby it is only necessary to provide one binary character that is of a different kind than the remaining binary characters. Although the concept of this invention may be employed for any code ranging from one out of ten through nine out of ten, the one out of ten code cannot be used as a recorded pattern but is only a theoretical possibility and useful as a transition code only. To this end the five out of ten pattern would provide the optimum encoder construction.

It should also be noted that, although the above tables define the invention, the pattern of binary characters may be complemented and still be within the scope of this invention. Table III below shows the two out of ten code of Table I for the decimal digits zero to nine as they would appear if each binary character is complimented.

*Table III*

| Decimal Digit | Sensing Elements A, BCD, EFG, H J K |
|---|---|
| 0 | 0, 1 1 1, 1 1 1, 1 1 0 |
| 1 | 0, 0 1 1, 1 1 1, 1 1 1 |
| 2 | 1, 0 0 1, 1 1 1, 1 1 1 |
| 3 | 1, 1 0 0, 1 1 1, 1 1 1 |
| 4 | 1, 1 1 0, 0 1 1, 1 1 1 |
| 5 | 1, 1 1 1, 0 0 1, 1 1 1 |
| 6 | 1, 1 1 1, 1 0 0, 1 1 1 |
| 7 | 1, 1 1 1, 1 1 0, 0 1 1 |
| 8 | 1, 1 1 1, 1 1 1, 0 0 1 |
| 9 | 1, 1 1 1, 1 1 1, 1 0 0 |

In this Table III the unique series for the decimal digit zero is still defined by the KAB elements, but which elements in this instance are represented by the binary characters 001, the compliment of the 110 series shown in Table I. In the same fashion, the decimal digit one is represented by the ABC elements or 001, et cetera. The pair of characters in the unique series characteristic of any decimal digit is still represented by the last binary character of the unique series and the adjacent binary character and which characters are of a different binary value.

Now referring to FIGS. 2 and 3A, one of the possible patterns for the encoder disc to produce the above described codes will be described. Referring specifically to FIG. 3A, it will be seen that the sensing elements or brushes for the portion of the illustrated track are identified by the letters, A,BCD,EFG,HJK corresponding to their identification in the chart of FIG. 3 and Table I. These sensing elements or brushes A–K are arranged, in this instance, in alignment transverse to the direction of the relative motion of the encoder. The encoder pattern as illustrated in both FIGS. 2 and 3A will be advanced towards the top of the sheet as viewed by the reader. Also, a common encoder track is shown on the right hand extremity and which track is provided with a separate sensing element or brush to which a voltage source is connected (not shown). In the drawings, the pattern is defined by conductive and nonconductive segments, a binary one is recorded as a conductive segment and represented as a shaded segment, while the binary character zero is recorded as a nonconductive portion or unshaded area. To this end, the two out of ten code illustrated is arranged whereby the conductive segments for each decimal digit are aligned diagonally across the track whereby they provide a complete conductive path from the common track to the A segment. The adjacent segments for successive counts have a common portion extending a unit distance or count and a similar portion extending a unit distance or count in opposite directions from the common portion and which latter portions are in turn in common with a segment for the succeeding digit. The conductive path to brushes A–J is from the common track to the K segment and successively through segments J–A in that order to the particular pair of brushes which engage a conductive segment. The K brush is energized by means of the direct connection between the common track and the K segment.

With this arrangement in mind, it will be seen that in FIG. 3A the brushes A–K generate a signal to represent the decimal digit zero, since only the A and K brushes engage a conductive segment and brushes B through J each engage a nonconductive segment. As the encoder disc travels towards the top of the page, it will be seen that the A and B brushes are in position to engage conductive segments, while brushes C–K are each located on a nonconductive segment. This combination will be seen by reference to the coding chart or Table I to represent the decimal digit one. In this same fashion the decimal digits two through nine may be traced for this encoder pattern.

Figure 4:
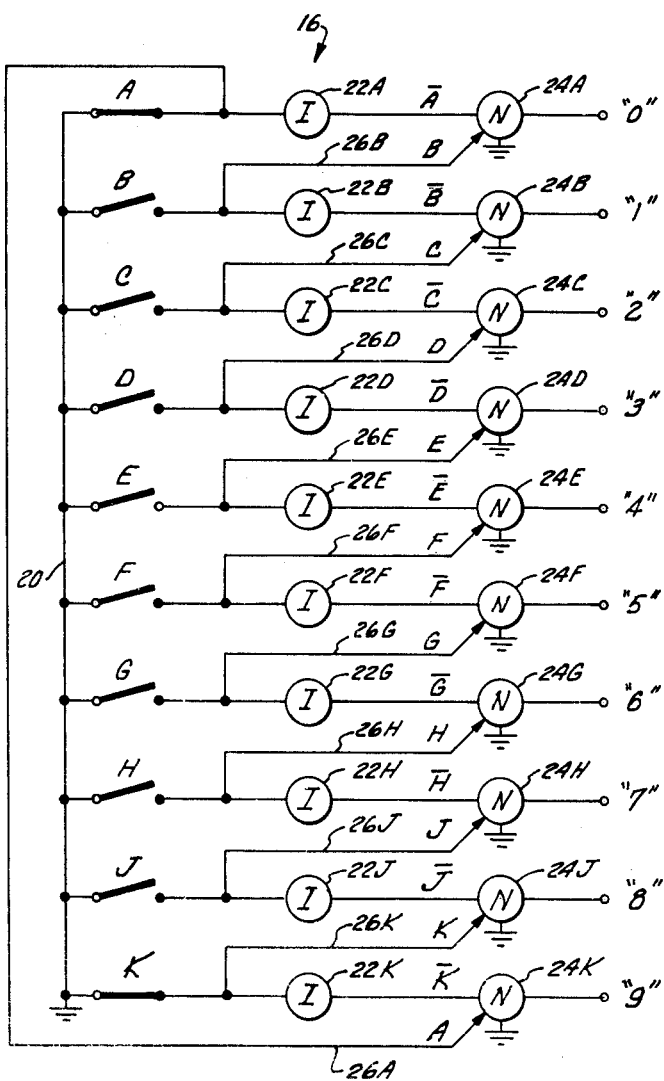
FIG. 4 is a translating circuit for the patterns shown in FIGS. 2 and 3.

With the above pattern of binary characters in mind, the circuit details for the translator 16 shown in FIG. 4 will now be examined more closely. The minimum logic for translating or providing an electrical indication of the decimal digit represented by a sensed pattern of binary characters is shown in Table IV for the decimal digits zero to nine.

*Table IV*

| | |
|---|---|
| 0 = A$\bar{B}$ | 5 = F$\bar{G}$ |
| 1 = B$\bar{C}$ | 6 = G$\bar{H}$ |
| 2 = C$\bar{D}$ | 7 = H$\bar{J}$ |
| 3 = D$\bar{E}$ | 8 = J$\bar{K}$ |
| 4 = E$\bar{F}$ | 9 = K$\bar{A}$ |

In the above table the identities are defined whereby each binary character represents a binary one. For example, for the decimal digit zero the identity is such that both A and $\bar{B}$ must be one before a zero is indicated. The barred letter indicates the complement of the same letter unbarred and which unbarred letter is a binary zero at this time. The identity may also be defined for the decimal digit zero as A equals one and B equals zero, B being the binary complement of the $\bar{B}$ element. In the same fashion, the remaining decimal digits are identified by this logic.

It should be further noted at this point that this minimum logic corresponds to the last binary character of the unique series discussed hereinabove and the adjacent binary character of that series. In each instance, it will be noted that the barred letter identifies the last binary character of the unique series and which letter has been represented as a binary zero in Table I. In the same fashion, the next adjacent binary character has been represented as a binary one and, accordingly, the unbarred letters identify this character. The remaining binary characters that are generated for any one decimal digit represent redundant data and which data may be utilized for error detection.

The pattern of binary characters disclosed has been characterized as bistrophic and described in terms of a unique series. The pattern of binary characters or unique series has one binary character that is significant in distinguishing one count from the next and that is the count that changes from a binary zero or "off" to a binary one or goes "on." This binary character is the unbarred letter for each count shown in Table IV. That is to say that, the fact that the other binary characters do not change or that they go "off," change to a binary zero, is of no significance in the translator.

The schematic representation of the translator 16 shown in FIG. 4 is arranged whereby the series of switches A–K represent the same lettered sensing elements or brushes for sensing the conductive and nonconductive segments of the pattern on the disc 12. A switch arranged in a closed position indicates that a brush has sensed a conductive segment, while an open circuited switch indicates the sensing of a nonconductive segment. One terminal of the switches A–K is connected in common with the lead wire 20. It will be recognized that the lead wire 20 is connected to a point of reference potential and corresponds to the circuit path provided by the common track and brush shown in FIGS. 2 and 3A. Accordingly, upon applying a suitable potential to the encoder disc by means of the common brush and track, a circuit path will be defined in accordance with the pattern of open and closed switches A–K. The pattern of switches A–K illustrated indicate the decimal digit zero. The A switch is in a conductive condition and therefore A equals one, and the B switch is in a nonconductive condition and $\bar{B}$ equals one. Referring to the logical Table IV it will be seen that A$\bar{B}$ logic does represent the decimal digit zero.

The circuit path for this pattern of switches may be traced from ground through the common lead wire 20 through the switch A, to an inverter circuit 22A and to one of the input terminals of a NOR circuit 24A and which NOR circuit has a single output terminal identified as the "0" terminal. The NOR circuit 24A has a second input terminal and which terminal is directly connected to the B switch by means of lead wire 26B. The construction of the NOR circuit 24A is of conventional design and well known, as evidenced by the disclosure in Electronic Design for February 5, 1958 in an article by W. D. Rowe, pages 24 through 30, entitled "Transistor NOR Circuit Design." The inverter circuit 22A is also of conventional structure and is utilized in this circuit arrangement to deliver the A element signal to the NOR circuit 24A at substantially the same voltage level as the level appearing at the other input circuit to detect coincidence of the unique pair of binary characters. The two signals appearing at the two input circuits for the NOR element 24A are identified as $\bar{A}B$ and which pair of signals will be noted to be the logical equivalent of the A$\bar{B}$ signals shown in Table IV. These latter mentioned signals are equivalent since they represent the complements of the signals noted in Table IV.

As described in the above-referenced Electronic Design publication, the simultaneous arrival of the $\bar{A}B$ signals at the NOR element 24 is effective to cut off the current conduction of the NOR element whereby a negative output voltage will be assumed at the output terminal "0" for this element.

The remaining decimal digits one to nine are provided with the same circuit elements as shown for the decimal digit zero. In each instance the ungrounded contact of the switches A–K are connected to an inverter circuit 22 in series with one input terminal for the NOR circuit 24 and the second input terminal is connected to receive directly the signal from the succeeding switch. The inverter circuits are identified by the reference numeral 22 suffixed with the corresponding letter of the switch it is connected to, 22A, 22B, 22C ... 22K. The NOR elements and the lead wires 26 are similarly identified as 24A–24K and 26A–26K respectively. In the case of decimal digit one then, the signals delivered to the NOR circuit 24B will be derived from the inverted signal provided by inverter 22B and the uninverted signal from the switch C delivered by means of lead wire 26C. With the circuit conditions as shown, it will be seen that no other logical identity shown in Table IV will be true. The signals appearing at the input terminals to the NOR circuit 24B will be different due to the inverter 22B even though both the B and C signals are in the binary zero state and, accordingly, the NOR element 24 will be in full conduction whereby the output terminal identified as "1" will approach ground potential. This same input and output condition will be true for the NOR elements 24C–24K, namely their output terminals "2," "3" ... "9" are at approximately ground potential as a result of the signal inversion provided by inverters 22C–22K. The decimal digit zero will then be indicated by the translator 16 since only the "0" output terminal is at a different voltage level from the remaining terminals or a negative voltage level. By changing the pattern of the switches A–K in accordance with the pattern of binary characters indicated in the tables, the operation of the translator circuit 16 to indicate the other decimal digits may be followed.

The translator circuit 16 may be modified to provide storage of the shaft position by substituting a conventional Eccles-Jordan flip-flop circuit for each of the inverters 22. It should also be noted that the logic described in Table IV may be implemented by means of relay switches rather than the NOR switches 24A–24K. It would only require ten relays to mechanize the logic of Table IV.

This same pattern may be utilized for the tens and hundreds tracks on the encoder disc 12. The tens digit track would be defined with the same pattern expanded over a distance ten times that required for defining a units digit whereby each segment extends a total distance equivalent to 19 counts. In the same fashion, the pattern will be expanded for the hundreds digits a factor of ten over the tens order as shown in FIG. 2.

When the tens and hundreds tracks on the encoder 12 are defined in terms of the above pattern, an ambiguity is possible at the transition from one decade to the next, for example, in going from 9 to 10, 19 to 20, 99 to 100, et cetera. The possibility of an ambiguity is eliminated by sensing the next higher decimal order and making a determination whether the sensed character is odd or even and modifying the first binary character or A element of the next lower order according to the following rules:

$A' = A$, when the next higher decimal order is an even number, $A' = \overline{A}$, when the next higher decimal order is an odd number, wherein $A'$ represents the modified A element and $\overline{A}$ the compliment of the sensed binary character.

It should be noted that the highest decimal order does not require such a modification of the A element since, in accordance with the above rules, the next higher decimal order is a zero, understood, and then $A' = A$. Therefore, the translator 16 will be connected as shown in FIG. 4 and operate as described hereinabove for the highest decimal order, in this instance the hundreds order.

higher order decades have been modified or from the output of the translators.

Figure 5:
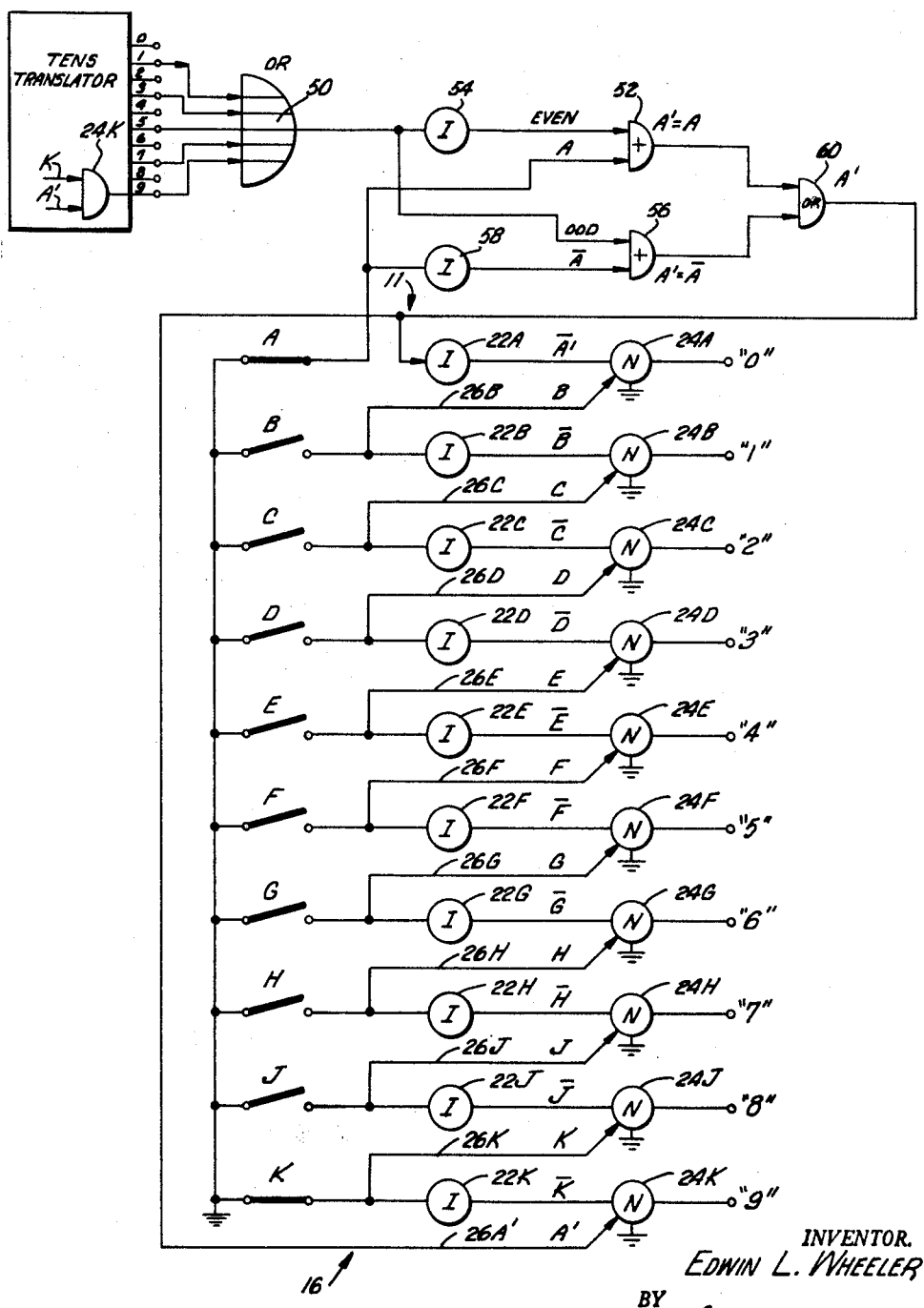
FIG. 5 is a translating circuit for the tens and units order encoded in accordance with the invention.

Now, referring to FIG. 5 in particular, the operation of the translator 16, modified to provide the correct value for the binary character A or the generation of the $A'$ character to avoid any ambiguities, will be examined with respect to the tens and units tracks. As will become more evident hereinafter, the same circuit arrangement shown in FIG. 5 would apply with equal validity for the signals derived from the hundreds and tens tracks.

The output of the translator 16 provided for the tens track will have the output terminals indicative of the odd digits "1," "3," "5," "7," and "9" connected directly to an OR circuit 50. Accordingly, when an odd digit is sensed on the tens track, an output indication corresponding thereto will be provided at the output terminal from the OR circuit 50. This output indication will be a relatively high level voltage when an odd digit is sensed and a relatively low level voltage when an even digit is sensed. The output indication from the OR circuit 50 is connected to an AND circuit 52 through an inverter 54 and in parallel circuit relationship directly to another AND circuit 56. The odd or even determination from the OR circuit 50 is combined in the AND circuit 52 with the signal

*Table V*

| Decimal Digit | Sensing Elements | | | | |
|---|---|---|---|---|---|
| | Hundreds A,BCD,EFG,HJK | A' | Tens A,BCD,EFG,HJK | A' | Units A,BCD,EFG,HJK |
| 0 | 1, 0 0 0, 0 0 0, 0 0 1 | 1 | 1, 0 0 0, 0 0 0, 0 0 1 | 1 | 1, 0 0 0, 0 0 0, 0 0 1 |
| 1 | | | | 1 | 1, 1 0 0, 0 0 0, 0 0 0 |
| 2 | | | | 0 | 0, 1 1 0, 0 0 0, 0 0 0 |
| 3 | | | | 0 | 0, 0 1 1, 0 0 0, 0 0 0 |
| 4 | | | | 0 | 0, 0 0 1, 1 0 0, 0 0 0 |
| 5 | | | | 0 | 0, 0 0 0, 1 1 0, 0 0 0 |
| 6 | | | | 0 | 0, 0 0 0, 0 1 1, 0 0 0 |
| 7 | | | | 0 | 0, 0 0 0, 0 0 1, 1 0 0 |
| 8 | | | | 0 | 0, 0 0 0, 0 0 0, 1 1 0 |
| 9 | | | | 0 | 0, 0 0 0, 0 0 0, 0 1 1 |
| 10 | | 1 | 1, 1 0 0, 0 0 0, 0 0 0 | 1 | 0, 0 0 0, 0 0 0, 0 0 1 |
| 11 | | | | 1 | 0, 1 0 0, 0 0 0, 0 0 0 |
| 12 | | | | 1 | 1, 1 1 0, 0 0 0, 0 0 0 |
| 13 | | | | 0 | 1, 0 1 1, 0 0 0, 0 0 0 |
| 14 | | | | 0 | 1, 0 0 1, 1 0 0, 0 0 0 |
| 15 | | | | 0 | 1, 0 0 0, 1 1 0, 0 0 0 |
| 16 | | | | 0 | 1, 0 0 0, 0 1 1, 0 0 0 |
| 17 | | | | 0 | 1, 0 0 0, 0 0 1, 1 0 0 |
| 18 | | | | 0 | 1, 0 0 0, 0 0 0, 1 1 0 |
| 19 | | 1 | 1, 1 0 0, 0 0 0, 0 0 0 | 0 | 1, 0 0 0, 0 0 0, 0 1 1 |
| 20 | | 0 | 0, 1 1 0, 0 0 0, 0 0 0 | 1 | 1, 0 0 0, 0 0 0, 0 0 1 |
| 21 | | | | 1 | 1, 1 0 0, 0 0 0, 0 0 0 |
| 29 | | | | 0 | 0, 0 0 0, 0 0 0, 0 1 1 |
| 30 | | 0 | 0, 0 1 1, 0 0 0, 0 0 0 | 1 | 0, 0 0 0, 0 0 0, 0 0 1 |
| 100 | 1, 0 0 0, 0 0 0, 0 0 0 | 1 | 0, 0 0 0, 0 0 0, 0 0 1 | 1 | 1, 0 0 0, 0 0 0, 0 0 1 |
| 500 | 0, 0 0 0, 1 1 0, 0 0 0 | 1 | 0, 0 0 0, 0 0 0, 0 0 1 | 1 | 1, 0 0 0, 0 0 0, 0 0 1 |

Table V is essentially similar to Table I but the tens and units columns include the binary value of the $A'$ character to omit any possible ambiguities in these orders. The $A'$ binary character is not recorded on the disc 12 but is generated in the translator. The normal pattern for the two out of ten code has been changed only with respect to the first binary character, A element, as it is recorded on the disc 12 but will be the same as the two out of ten code as it is derived from the translator when the $A'$ value is substituted for the sensed value for the element A.

The change in value of the A element can be best appreciated from an examination of the units column of Table V. The A element column alternately represents the binary values of one and zero for ten counts, starting at count two with the binary value zero. Counts zero and one are represented by the binary value one in the A column, with the remaining eight counts having the binary one value, extending back to the count 992 for an encoder providing 1,000 counts. The A element can then be seen to be "off" for the counts two to 12, "on" from 12 to 22, et cetera. The $A'$ element is then defined in accordance with the above rules depending on the odd or even value of the next higher decade. In the lower order decades the determination of "odd" or "even" is made after the indicative of the binary character A which is directly coupled thereto, while the AND circuit 56 is provided with the $\overline{A}$ signal derived from the inverter circuit 58 coupled intermediate AND circuit 56 and the A sensing element. The output terminals of AND circuits 52 and 56 are coupled to an OR circuit 60 and which OR circuit provides the correct indication for the binary character $A'$. The output terminal of the OR circuit 60 is in turn coupled to the inverter 22A in the same fashion as the A element was coupled in the description of the translator shown in FIG. 4 and also coupled to the NOR circuit 24K by means of the lead wire 26A'.

With the above circuitry in mind and the rule for deriving the $A'$ value, the operation of the translator 16 of FIG. 5 will be explained. Assuming the sensing elements for the tens track senses the decimal digit "0" and which digit is an even number, a relatively low level output indication will be provided from the OR circuit 50 on the "odd" bus. Accordingly, the relatively low signal derived from the OR circuit 50 appears as a high level signal on the "even" bus at the AND circuit 52 as a result of the provision of the inverter 54. Further assuming that the sensing elements for the units track sense the digit "0," the pattern of switches A–K will be as illustrated in FIG. 5. Since the A switch is closed during this interval, a relatively high level signal will appear at the AND circuit 52 substantially simultaneously with the determination that the tens order is an even digit whereby the output from AND circuit 52 indicates that the A' value at this instance is equal to A. This output indication will be derived from the OR circuit 60 and applied directly to the inverter 22A and thence to the NOR circuit 24A' in combination with the binary value for the B sensing element to indicate the decimal digit zero has been sensed in the same fashion as explained hereinabove.

It will be recognized that the A' digit will be equal to A for counts zero through nine and when the count 10 is to be indicated from the translator the tens track will provide the digit one, which is an odd digit. Accordingly, the signal appearing from the output terminal representing the decimal digit one provides an output indication at the odd bus of the OR circuit 50 of a relatively high level which is coupled to the AND circuit 56. By reference to Table V it will be noted at this time that the A element senses a binary zero whereby the A switch will be open and a relatively low output signal will be provided. This low output signal is converted to a relatively high level $\overline{A}$ signal by means of the inverter 58 and coupled in combination with the high level "odd" signal at the AND circuit 56 to provide an output indication of the digit zero. The sensed binary value of the A element will be complemented throughout the counts 10 through 19 since during this interval the tens track is continually providing the odd digit one. In traversing from the decimal digit 19 to 20, the tens track will switch from an odd to an even digit and once again the A' indication will equal the sensed value of the A element. The pattern of characters developed for each track may be further checked against the binary values indicated in Table V. Typical counts represented in Table V are indicated by the dot-dash lines shown in FIG. 2 and identifying the total decimal count at the right hand extremity of the dot-dash lines (0, 10, 19, 20, 21, 100, et cetera).

It will be recognized now that no odd or even determination is necessary for the hundreds translator but that the tens translator is dependent upon an odd or even determination with respect to the signal sensed for the hundreds track. Only after the odd or even determination is made for the hundreds track can the same determination be made for the tens track for application to the units translator. This will readily be appreciated by referring to Table V. Also, it will be noted that in recording the pattern for the A character the displacement or shift in the count from the zero count is dependent upon which ten bit code is employed. In the above example the two out of ten code was described and a two count displacement is shown. If the five out of ten or $n$ out of ten code is utilized, the count will be shifted five or $n$ places from the zero count to provide the correct A' output indication.

Although the tens and hundreds track have been defined in terms of this same code or pattern, it should be noted at this point that the high resolution advantages of the code of this invention may be obtained by using the code only for the lower order or units track while employing other codes for the tens and hundreds track.

Now, returning to FIG. 3B, another encoding pattern in accordance with the present invention will be examined. The encoding pattern and arrangement of sensing elements shown in FIG. 3B are defined to provide the same pattern of output binary characters as the pattern shown in FIG. 3A and the accompanying chart. Accordingly, it will be understood that the translator circuit 16 will provide the desired output indication in the same fashion as described when the encoder disc 12 is arranged as shown in FIG. 3B. The binary characters are arranged for a decimal order whereby one straight conductive segment is arranged on the track on the disc 12 and which segment is aligned transverse to the direction of the relative movement of the encoder disc 12 and the sensing element 14. The conductive segments are spaced a distance equivalent to eight counts and each have a length equivalent to two counts. The ten sensing elements, or brushes 14, are arranged in alignment diagonally across the track as shown in FIG. 3B, and each brush is spaced a distance equivalent to one count from its adjacent brushes. In this fashion it will be seen that only two brushes will engage or sense a conductive segment for any one count to provide the two out of ten pattern. The output signals from the ten brushes are identified in the same fashion as the brushes in FIG. 3A and also correspond to the switches A–K for the translator circuit 16. The common track and its associated common brush in this configuration provides the series circuit path to the conductive segments and through the engaging brushes.

The brush arrangement shown in FIG. 3B represents the count or decimal digit zero, as was indicated in FIG. 3A. By examining FIG. 3B it will be seen that brushes A and K are the only brushes that engage a conductive segment and, in checking this pattern of binary characters with the chart of FIG. 3A, it will be recognized that this pattern of characters does represent a zero count. Assuming the encoder disc 12 is moved a distance equivalent to one count towards the top of the page as illustrated, the configuration of the binary characters generated by brushes A–K should represent the count one. When the disc 12 is moved a distance equivalent to one count, brushes A and B engage the upper most conductive segment while brush K has moved from the lowermost conductive segment to the adjacent nonconductive segment. Also, the remaining brushes C–J have been stepped up a count but are maintained in a nonconductive state. With this pattern, namely 1,100,000,000, the translator 16 will indicate the decimal digit one. In the same fashion, the remaining digits may be generated by stepping the encoder count by count.

The code of the present invention may be further developed by using the pattern configuration of FIG. 3B by arranging the sensing elements or brushes in alignment parallel to the direction of relative movement of the encoder disc 12 and the sensing elements A–K as in FIG. 3B but in longitudinal alignment rather than diagonal. Essentially then, the track configuration shown in FIG. 3B is compressed to one-tenth the length shown for the configuration of FIG. 3C. The brushes A–K are again in this instance spaced apart a distance corresponding to one count whereby only two sensing elements engage a conductive segment at any one count. The pattern arrangement and the brush arrangement shown in FIG. 3C, once again, represents the zero count or decimal digit. The remaining digits may be seen to correspond to the chart of FIG. 3A by stepping the encoder disc 12 one count at a time.

The single track arrangement of FIG. 3C may be further modified wherein a single sensing element or brush is employed and a plurality of discrete segments are utilized to define a decimal order. In the arrangement of FIG. 3D each binary character is represented by a segment that is electrically isolated from its adjacent segment and from the common track. The segments in this instance are identified by the reference characters A–K for a decimal order. The segments are provided with individual lead wires from which the pattern of signals is obtained and delivered to the translator 16. The common track is provided with a common brush 28 and in this instance the common brush is directly electrically connected by a lead wire with a single sensing element or brush 29 arranged in alignment with the segments identified as A–K. This configuration will generate the same pattern of binary characters indicated in the chart of FIG. 3A when the sensing brush 29 is defined to have a length sufficient to bridge the nonconductive segment between the pair of conductive segments as shown in FIG. 3D. With this arrangement it will be found convenient to maintain the disc 12 stationary while the brushes 28 and 29 are moved relative thereto in contrast with the previously described arrangements wherein the brushes may be more advantageously held in a stationary position and the encoder disc 12 is moved in accordance with the rotation of shaft position to be digitized.

The concept of this invention can be extended to define binary coded decimal digits as well as directly defining the values of a number system directly including the decimal digits as described hereinabove. The chart of FIG. 6 indicates a code or pattern of four binary characters for defining the decimal digits zero through three, coded in terms of a pure or natural binary code. This same code characteristic is evident when just the four binary characters or bits are employed as when the ten binary characters or bits are used. Namely, the unique series defined hereinabove is still true for this arrangement since the position of the last binary character and the adjacent binary character of this unique series is characteristic of the decimal digit. The series in this instance comprises the binary characters 110 and for the decimal digit or count zero, this series is represented by the binary characters DAB in that order. This series for the decimal digit one is represented by the ABC elements, and, likewise, the decimal digit two is represented by the BCD series, and the CDA series is characteristic of the decimal digit three. As the chart of FIG. 5 indicates, these decimal digits are represented by the natural binary code utilizing only the $2^0$ and the $2^1$ bits of the natural binary code.

Figure 7:
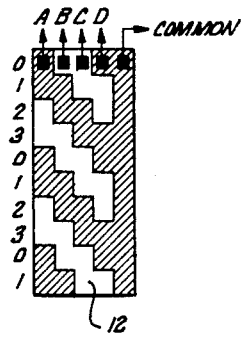
FIG. 7 is a schematic representation of an encoder pattern and associated sensing elements for the binary coded-decimal arrangement of FIG. 6.

This pattern of binary characters may be recorded on the encoder disc 12 by an arrangement shown in FIG. 7. It will be recognized that the pattern of FIG. 7 is similar to the arrangement of FIG. 3A, modified to only handle the four binary characters rather than the ten shown in FIG. 3A. It should also be recognized that any of the other patterns shown in FIG. 3A may be recorded on the encoder disc 12 for developing this binary coded decimal arrangement. The count or decimal digit illustrated in FIG. 7 represents the digit zero since the pattern of the ABCD brushes represents 1001 respectively. The remaining decimal digits may be developed and checked against the chart of FIG. 6 by stepping the relative positions of the brushes A–D and the encoder disc 12 one count at a time.

*Table VI*

| Count | Binary $2^1$ $2^0$ | Code DCBA |
|---|---|---|
| 0 | 0 0 | 1 0 0 1 |
| 1 | 0 1 | 0 0 1 1 |
| 2 | 1 0 | 0 1 1 0 |
| 3 | 1 1 | 1 1 0 0 |
| 0 | 0 0 | 1 0 0 1 |
| 1 | 0 1 | 0 0 1 1 |
| 2 | 1 0 | 0 1 1 0 |
| 3 | 1 1 | 1 1 0 0 |

Table VI indicates the decimal counts and their equivalent binary coded decimal characters and the pattern of four bits to represent these digits. The binary decimal coding for the decimal digits zero through three may be represented by the following logic:

$$2^0 = \overline{A}D + B\overline{C}$$
$$2^1 = \overline{A}D + C\overline{D}$$

This logic may be mechanized by the circuit configuration shown in FIG. 6. The A sensing element is connected to an inverter circuit 30 having its output circuit connected to a two-input AND circuit 32. The remaining input circuit for the AND circuit 32 is directly connected to receive the signal from the D sensing element. The output circuit for the AND circuit 32 is directly connected to one of the input circuits for the OR circuit 34. This latter mentioned output circuit is also connected by means of a diode 36 to one of the input circuits for the OR circuit 38. As will be better appreciated immediately hereinafter, the output circuit for the OR circuit 34 represents the $2^0$ digit in the binary code, while an OR circuit 38 indicates the $2^1$ digit output. The D sensing element is directly connected to an inverter circuit 40 having its output circuit directly connected to an AND circuit 42 and which AND circuit 42, which is also a two-input circuit, having its remaining input connected directly to the C sensing element. The output of AND circuit 42 is directly connected to the remaining input terminal for the OR circuit 38. An inverter circuit 44 is connected to receive the signal from the C sensing element and one of the input terminals for AND circuit 46. The B element is connected directly to the remaining input terminal of AND circuit 46 and which circuit has its output terminal directly connected to the OR circuit 34.

The operation of the translator circuit of FIG. 6 can be best examined by reference to the chart of FIG. 6. Assuming the binary pattern 1001 is provided by the sensing elements A–D respectively, the binary output indications may be determined. It should be recognized at this point that the coincidence of binary ones or, in terms of voltage levels, both voltage levels must be relatively high to obtain an output indication from the AND circuits. Examining the input signals for the AND circuit 32, it will be seen that at this interval the D signal will be one, or high, and the $\overline{A}$ signal will be zero, or low, and so no output signal will be provided from the circuit 32. In the same fashion, the $\overline{D}$ signal will be low and the C signal will also be low and so no output signal will be derived from circuit 42. At this same time the $\overline{C}$ signal will be high and the B signal will be low and which signals prevent an output signal appearing at the output terminal of the AND circuit 46. Accordingly, both the $2^0$ and $2^1$ output terminals will be at a relatively low potential, representative of the decimal digit zero. Assuming now the count has progressed to the decimal digit one, the pattern for terminals A–D will be 1100, respectively. At this count the $\overline{A}$ and D signals appearing simultaneously at the AND circuit 32 are both low, whereby no output indication is delivered to the OR circuits 34 and 38. The $2^1$ output will not be activated since the signals appearing at the AND circuit 42 are a high $\overline{D}$ signal and a low C signal. The AND circuit 46 is provided with a high level $\overline{C}$ signal and a high level B signal whereby the output indication from AND circuit 46 appears at the $2^0$ output terminal for OR circuit 34. Accordingly with the $2^0$ output high and the $2^1$ output low, this binary output pattern corresponds to the decimal digit one. The remaining decimal digits may be indicated by the same translator circuit by applying the corresponding pattern of binary characters shown in the chart. The decimal digit three requires both $2^0$ and $2^1$ outputs to be high. This results only when the pattern 0011 (ABCD) is delivered. During this interval of time $\overline{A}$ is high and D is high, whereby the output signal from AND circuit 32 is delivered to both OR circuits 34 and 38 to provide the required output indication. The signal from AND circuit 32 is delivered to OR circuit 38 by means of a direct circuit connection, as shown. Since the AND circuit 32 provides an output indication only in response to the pattern for the digit three, it is the only time a signal is delivered to both OR circuits 34 and 38.

Now referring to FIGS. 8 and 9, an encoder employing only seven binary characters for nonambiguously defining a ten decimal digits and embodying the invention will be described:

Table VII

| Decimal Digit | Sensing Element | | |
|---|---|---|---|
| | A' | A B C D E F G | F' | G' |
| 999 | 0 | 1 0 0 1 1 0 1 | 1 | 0 |
| 000 | 1 | 1 0 0 0 1 0 1 | 0 | 1 |
| 001 | 1 | 1 1 0 0 0 0 1 | 0 | 1 |
| 002 | 0 | 0 1 1 0 0 0 1 | 0 | 1 |
| 003 | 0 | 0 0 1 1 0 0 1 | 0 | 1 |
| 004 | 0 | 0 0 0 1 1 0 1 | 0 | 1 |
| 005 | 0 | 0 0 0 0 1 1 1 | 1 | 1 |
| 006 | 0 | 0 1 0 0 0 1 1 | 1 | 1 |
| 007 | 0 | 0 1 1 0 0 1 0 | 1 | 0 |
| 008 | 0 | 0 0 1 1 0 1 0 | 1 | 0 |
| 009 | 0 | 0 0 0 1 1 1 0 | 1 | 0 |
| 010 | 1 | 0 0 0 0 1 1 0 | 0 | 1 |
| 011 | 1 | 0 1 0 0 0 1 0 | 0 | 1 |
| 012 | 0 | 1 1 1 0 0 1 0 | 0 | 1 |
| 013 | 0 | 1 0 1 1 0 1 0 | 0 | 1 |
| 014 | 0 | 1 0 0 1 1 1 0 | 0 | 1 |
| 015 | 0 | 1 0 0 0 1 1 1 | 0 | 0 |
| 016 | 0 | 1 1 0 0 0 1 1 | 0 | 0 |
| 017 | 0 | 1 1 1 0 0 0 1 | 1 | 0 |
| 018 | 0 | 1 0 1 1 0 0 1 | 1 | 0 |
| 019 | 0 | 1 0 0 1 1 0 1 | 1 | 0 |
| 020 | 0 | 1 0 0 0 1 0 1 | 0 | 1 |

The pattern of binary characters shown in Table VII is a species of the method of counting by multiple fives since the same combination of four binary characters are utilized to identify the counts 1, 2, 3, 4, and 6, 7, 8, and 9. These counts are identified by the elements B, C, D, and E. The A element is only utilized to identify the count zero. The F and G elements are utilized to identify the count five as well as distinguish which counts or series the elements B, C, D, and E identify, that is, whether they identify the counts or first series 1 through 4 or the counts or second series 6 through 9.

The pattern of binary characters as it is recorded on the encoder disc 12 may or may not be the same as the pattern of binary characters emerging from the translator 16 depending upon whether the next higher order decade is odd or even. The pattern of binary characters is shown in FIG. 8 adjacent the chart showing the corresponding groups of binary characters A through G as recorded on the disc 12. It will be noted that the chart includes the elements A', F' and G' and which elements are not recorded on the disc but are generated within the translator. When examining the pattern of binary characters in order to determine the similarities with the above described patterns, the pattern of binary characters should be examined in terms of the elements A', B, C, D, E, F', and G' and not the pattern recorded on the disc 12. To obtain the values of A', F', and G' for any one count the logical rules below should be followed:

$A' = A$ (even) $+ \bar{A}$ (odd)
$F' = F$ (even) $+ G$ (odd)
$G' = G$ (even) $+ F$ (odd)

wherein even and odd refer to the next higher order.

The track for the A element is defined on the encoder disc 12 by means of ten counts corresponding to a binary one or "on," followed by ten counts representing a binary zero or "off." This arrangement of characters is located with a binary zero starting at the decimal count two and extending to 11, at which count a binary one starts and extends for ten counts. Counts zero, one, and 999 represent the binary number one; see FIG. 8. In the same fashion the tracks for the elements F and G are defined whereby 12 conductive segments are followed by eight non-conductive segments. The conductive and nonconductive segments for the F and G tracks are alternately arranged and a pair of conductive segments overlap at counts five and six. An examination of FIG. 8 will indicate that at count five the track F undergoes a change from a binary zero to a one and extends for 12 counts, that is, through count 16. At count seven for the G track the conductive segments end and the nonconductive segments start and extend a distance equal to eight counts.

Accordingly, the F and G segments for both counts five and six represent a binary one in the same fashion that the counts 15 and 16 are represented by binary one on these tracks. The significance of this overlap with respect to the counts 15 and 16 will become more apparent hereinafter in the description of the translator for this seven element code.

In the pattern of binary characters described hereinabove a unique series of elements was utilized throughout to define the significant elements for any one count. The same series may be defined for the present seven elements code by examining Table VIII below, however, in order to simplify the description, the significant feature for any one count can be more easily appreciated by merely examining a single element, namely the element that goes "on," or changes from a binary zero to a binary one. The feature that only one binary element changes from zero to one is not only true of the seven element pattern but also of the above described arrangements as mentioned hereinabove. In the above described pattern of binary characters it was indicated that not only the pattern of characters as recorded on the disc 12 was possible, but any other transition code may be generated in the translator and which transition codes would produce the same count. The transition codes produce the correct counts since it is the single binary character that changes from a zero to a one without regard to whether the rest of the binary characters change to a zero or do not change that is significant in identifying any one count in these codes as well as the one presently under examination. The present seven element pattern is also bistrophic when viewed in the translator (consider change from count 9 to count 10).

The unique series or significant element in the series for each count of the seven element pattern is shown in Table VII and FIG. 8 and is identified below in Table VIII.

Table VIII

| Decimal Digits | Significant Elements | Logic |
|---|---|---|
| 0 | A' | A'$\bar{B}$ G' |
| 1 | B | B $\bar{C}$ G' |
| 2 | C | C $\bar{D}$ G' |
| 3 | D | D $\bar{E}$ G' |
| 4 | E | E $\bar{F'}$ G'$\bar{A'}$ |
| 5 | F' | F'$\bar{B}$ G' |
| 6 | B | B $\bar{C}$ F' |
| 7 | C | C $\bar{D}$ F' |
| 8 | D | D $\bar{E}$ F' |
| 9 | E | E $\bar{A'}$ F'$\bar{G'}$ |
| 10 | A' | A'$\bar{B}$ G' |
| 11 | B | |
| 12 | C | |
| 13 | D | |
| 14 | E | |
| 15 | F' | |
| 16 | B | |
| 17 | C | |
| 18 | D | |
| 19 | E | |
| 20 | A' | |

It will be seen from Table VIII that the first series, or counts one through four are successively identified by the elements B through E as well as the second series, or the counts six through nine. The A' element is significant to identify the counts 0, 10, 20, et cetera while for the counts 5, 15, 25, et cetera are identified by element F'. By examining Table VII or FIG. 8 it will be noted that the element F' in changing from a zero to a one differentiates the count five from count zero if the A element is ignored.

The unique series beginning with a binary character of one kind and ending with a binary character of the other kind can be derived from Table VIII if the F' and G' elements are ignored when they are used only to identify the first or second series and the A' and G' elements are ignored for counts four and nine as set apart in the table.

Now referring to FIG. 9, the translator 16 for providing the output indications for the decimal digits zero through nine will be described. The translator 16 is organized as in the above described embodiments and the sensing elements A–G are shown as switches in a position corresponding to the sensed count zero. To this end, only the switches A, E, and G represent a binary one, while the other elements B, C, D, and F represent a binary zero in accordance with the pattern shown in FIG. 8. The odd or even determination for the next higher order, in this instance, is shown as the tens translator in block form provided with the output terminals zero through nine. The even output terminals zero, two, four, six, and eight are connected to an OR circuit 66.

It will be recognized by those skilled in the art that when the tens translator indicates any one of the even digits a relatively high level output signal will appear from the output of the OR circuit 66 on the "even" bus. An inverter 67 is connected to the even bus whereby when an even digit is indicated by the tens translator a relatively low level output signal will appear from the inverter 67 on the "odd" bus. The even and odd buses are utilized in combination with the signals derived from the A, F, and G elements to respectively define the signals A', F', and G' in accordance with the logical expressions noted above.

The odd bus is connected to an AND circuit 68 in combination with the $\bar{A}$ signal defined by means of the inverter 70 coupled intermediate the AND circuit 68 and the A sensing element. The even bus is connected to an AND circuit 71 in combination with the A signal from sensing element A. The output signals derived from AND circuits 68 and 71 are coupled by means of an OR circuit 72 and which OR circuit provides the A' signal at its output terminal. The $\bar{A}'$ signal is defined by means of an inverter 73 coupled to be responsive to the signal from OR circuit 72. This combination of logical circuitry will be seen to conform to the logical expression that A' is the same as A when the next higher order decade is even or that A' is equal to the complement of A ($\bar{A}$) when the next higher order decade is odd.

The F' signal is generated by means of an AND circuit 74 by utilizing the signal derived directly from the F sensing element in combination with the signal from the even bus. The F' signal, in accordance with the above logical expressions, may also be generated by means of an AND circuit 75 responsive to the signal on the odd bus and the signal from the G element. The output indications from AND circuits 74 and 75 are combined by means of an OR circuit 76 to define the F' signal at the output terminal thereof. The $\bar{F}'$ signal is provided by means of an inverted circuit 77 responsive to the output signal from OR circuit 76. In the same fashion, a pair of AND circuits 78 and 79 are utilized in combination with an OR circuit 80 to define the G' signal. The AND circuit 78 is responsive to the signal on the odd bus along with the signal derived from the F sensing element, while the AND circuit 79 is responsive to the signals provided by the even bus and the G sensing element. The OR circuit 80 is responsive to the output indications from AND circuits 78 and 79 to provide the G' signal at its output terminals. The $\bar{G}'$ signal is derived by means of the inverter 82 coupled to be responsive to the output of the OR circuit 80.

The signals A', F', and G' thus derived are utilized in combination with the signals derived from sensing elements B, C, D, and E to identify the decimal digits zero through nine. The complement of the signals derived from the sensing elements B, C, D, and E is provided by means of the inverters 83, 84, 85, and 86 respectively. To define the decimal digit zero, a three-input terminal AND circuit 88 is provided and which AND circuit is responsive to the A', $\bar{B}$, and G' signals, as shown. The decimal digit one is defined by the unique output from the AND circuit 89 responsive to the signals B, $\bar{C}$, and G'. In this same fashion the AND circuit 90 indicates the sensing of the decimal digit two in response to the C, $\bar{D}$, G' signals. The decimal digit three is derived from the AND circuit 91 in response to the D, $\bar{E}$, G' signals. The decimal digt four is derived from the four-input terminal AND circuit 92 in response to the simultaneous occurrence of the E, $\bar{F}'$, G', and $\bar{A}'$ signals. The count five is derived from the three-input terminal AND circuit 93 in response to the coincidental occurrence of the F', $\bar{B}$, and G' signals. Count six is derived from AND circuit 94 in response to the B, $\bar{C}$, and F' signals, while count seven is derived from AND circuit 95 in response to the C, $\bar{D}$, F' signals. Counts eight and nine are respectively derived from AND circuits 96 and 97. The AND circuit 96 is responsive to the signals D, $\bar{E}$, F', while AND circuit 97 is responsive to signals E, $\bar{A}'$, F', $\bar{G}'$.

Figure 8:
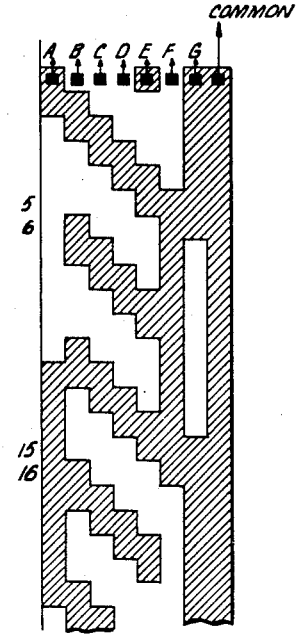
FIG. 8 is a schematic representation of a modified encoder pattern and associated sensing elements for representing the code shown in the accompanying chart.
Figure 9:
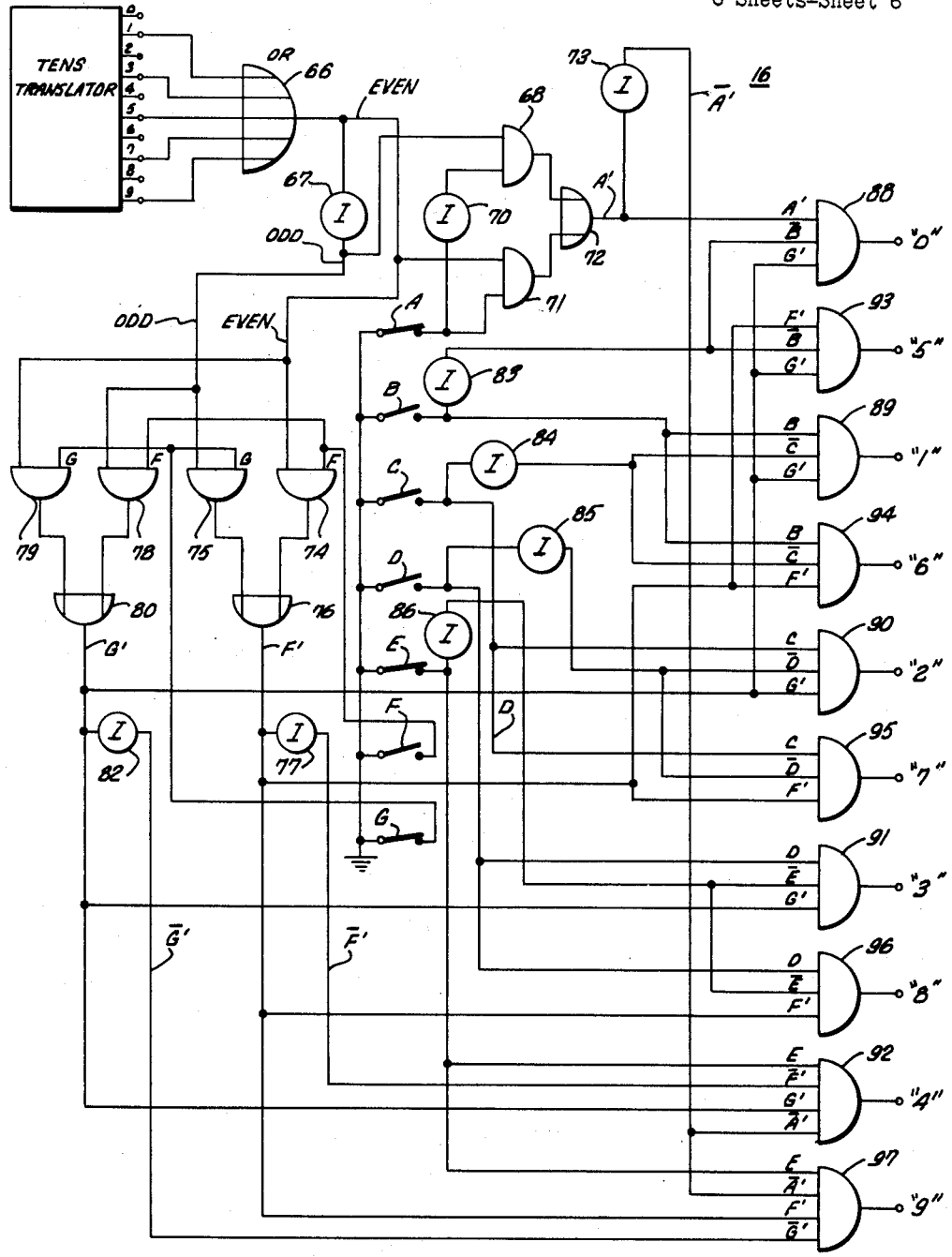
FIG. 9 is a translating circuit for the pattern shown in FIG. 8.

The operation of the translator 16 will now be examined in conjunction with the pattern and binary characters of FIG. 8. The operation of the translator 16 will be first examined to trace the circuit operation when the count zero is sensed. When the count zero is indicated by the encoder, the next higher order digit in the tens translator is a zero, or an even number. At this time a relatively high voltage appears on the even bus, while a relatively low voltage appears at the odd bus. Stated differently, the A', F', and G' signals are the same as the signals A, F, and G recorded on the disc 12. Examining the inputs A', $\bar{B}$, G' for the AND circuit 88 from which the unique output will be derived for defining the count zero, it will now be recognized that the A' signal is at a relatively high level since the element A senses a binary one (A even). At this time the sensing element B senses a binary zero and, accordingly, the $\bar{B}$ signal derived from inverter 83 will be relatively high. The sensing element G will provide a relatively high voltage as a result of sensing a binary one and this relatively high voltage is combined with the relatively high voltage on the even bus in AND circuit 79 to produce a relatively high level signal at its output and correspondingly at the output of the OR circuit 80. This then defines the G' signal as a relatively high level signal and which high level signal in combination with the high level A' and $\bar{B}$ signals will define the decimal digit zero at the output terminal of the AND circuit 88 by means of a unique output signal.

An examination of the AND circuits 89 through 97 will indicate that when the sensing elements A–G are arranged as illustrated, the only unique output signal defining a decimal digit will be the one from the AND circuit 88 indicating the count of zero since the input signal conditions for no other AND circuit 89 through 97 will be satisfied at this time.

Assuming now the encoder disc 12 has been rotated to a position wherein the sensing elements A–G correspond to the count ten, the elements A–G and the corresponding switches will then provide signals representing the pattern 0 0 0 0 1 1 0. In order to indicate the count ten the tens translator will be set to indicate a count of one, while the units translator will indicate the count of zero. The tens translator is similar to the circuit arrangement shown in FIG. 9 for the units translator with the exception that it is responsive to the even numbered counts from the hundreds translator. With the tens translator indicating the count one, or an odd number, the odd bus will now be at a high level and the even bus will be at a relatively low level and which voltage levels are opposite to that described hereinabove for the count zero. At this time the A signal is at a relatively low level and will be inverted by means of the inverter 70 to a high level signal and this $\overline{A}$ is combined with the high level signal from the odd bus in the AND circuit 68 whereby the A' signal derived from the OR circuit 72 will be at a relatively high level when delivered to the AND circuit 88. The B sensing element will provide a relatively low signal and which signal will be inverted to provide the $\overline{B}$ signal at AND circuit 88. In order to indicate the count zero, the G' signal must also be at a relatively high level and in order to be at this level must satisfy the logical expression of F being high and the odd bus being high.

Referring to Table VII, it will be noted that for count ten the F sensing element delivers a relatively high signal and this is combined in the AND circuit 78 with the signal form the odd bus whereby the signal G' derived from OR circuit 80 will be at a relatively high level to satisfy the input conditions for the AND circuit 88 and thereby once again indicate the count zero from the units translator.

When the sensing elements A–G sense the pattern 1 0 0 0 1 1 1, the encoder disc 12 has been rotated to a position corresponding to the count 15. At this time the tens translator is indicating an odd number, and the A' signal is equal to $\overline{A}$, while the F' signal is equal to G, and G' is equal to F. The output from the units translator then should indicate the count five from this pattern of sensed signals. The count five is derived from the AND circuit 93 and requires a relatively high level F', $\overline{B}$, and G' signal to produce this output indication. At count 15 the sensing element B senses a binary zero, or nonconductive segment, and produces a relatively low output signal. This relatively low output signal is complemented by the inverter 83 to produce a relatively high level $\overline{B}$ signal at AND circuit 93. The F' signal is generated by the combination of the G signal which is sensed as a binary one and the relatively high level odd bus signal. The G and odd signals are combined in the AND circuit 75 to produce a relatively high level F' signal from the OR circuit 76 which is coupled to the F' terminal of AND circuit 93. In the same fashion, the G' signal is generated by the combination of the relatively high level F signal sensed on the encoder disc 12 in combination with the odd signal. The F and odd signals are combined in AND circuit 78 to produce a high level G' signal from the OR circuit 80 and which G' signal is coupled to the G' terminal of AND circuit 93. It will now be seen that each of the F', $\overline{B}$, G' signals arriving at the AND circuit 93 are at the same high voltage level to indicate the count five.

It should be noted that with respect to count 15 in Table VIII hereinabove, the unique element was indicated as F'. In examining the pattern of binary characters for the count 15 it will be noted that in going from count 14 to 15 there is no change in the output of the sensing element F as might be expected in accordance with Table VIII. However, since we must not consider the pattern of binary characters as represented on the encoder disc 12 but the pattern of characters as they are modified after the odd or even determination is made, it is necessary to look at the F' value rather than the F. F' during an odd series will be equal to the G signal. Referring back to Table VIII, it will be noted that the G signal goes from a binary zero to a binary one and, accordingly, the F' signal is characteristic of the count 15 since it is the only signal going from zero to one at this interval. In the same fashion, in going from count nine to count ten, the sensing element A indicates a binary zero for both counts, however, the A' signal which is characteristic of the count ten changes from a zero to a one as a result of going from an even to an odd higher order digit. The remaining counts represented in Table VII as well as the counts through 999 may be traced by means of FIGS. 8 and 9 to prove out the seven element cyclic decimal pattern The seven element pattern described hereinabove may be employed in an encoder having a resolution of one part in 3600 with the encoder disc having an outside diameter of 3.750 inches. The disc would have a single-sided pattern. Other known non-ambiguous binary decimal patterns require a disc having an outside diameter of 7.125 inches, or twice the size.

It will now be appreciated that the above invention has advanced the state of the art by providing a high resolution code for representing values in any number system for encoder construction which doubles the resolution heretofore thought possible. It should be noted that although the invention has been described in terms of a commutator disc and brush combination, the invention may be utilized in optical encoders or encoders utilizing magnetic coupling or capacitive coupling.

What is claimed is:

1. A shaft position digitizer including an element having a continuous common track of a preselected binary character and a preselected pattern of binary characters recorded in different tracks thereon, the preselected pattern of binary characters comprising a binary character of the same kind as the common tack for each value, the binary characters being spaced apart a preselected distance corresponding to a single count by binary characters of a different kind and spaced from said common track, means for sensing preselected binary characters in each track, said sensing means comprising a single sensing element defined to bridge the adjacent pair of binary characters of the same kind at the count transition zone and a single sensing element for the common track electrically connected to said first mentioned sensing element, means for producing relative movement between said element and said sensing means in accordance with the position of a shaft to be digitized, said preselected pattern of binary characters further comprising a plurality of binary characters of different kinds arranged in the different tracks for representing the different orders of a preselected number system, at least one of the tracks having a plurality of binary characters arranged relative to the sensing means whereby the latter provides a unique series of successive binary characters beginning with a binary character of one kind and ending with a binary character of the other kind and with the first and last of said binary characters of each series changing in opposite directions in progressing between decimal digits, and means responsive to the sensing means for providing an electrical indication of the value of the sensed portions of the pattern of binary characters for each order.

2. An encoder including an element having a preselected pattern of binary characters recorded in tracks thereon, means for sensing preselected binary characters in each track, means for producing relative movement between said element and said sensing means in accordance with an analog signal to be encoded, said preselected pattern comprising a plurality of binary characters of different kinds arranged to represent different orders of a preselected number system, at least the track for the lowest order having a plurality of binary characters arranged relative to the sensing means whereby the latter provides a unique series of successive binary characters beginning with a binary character of one kind and ending with a binary character of the other kind and with the first and last of said binary characters of each series changing in opposite directions in progressing between values, and means for electrically indicating the sensed value of each order including means for the lowest order for coincidentally determining the opposite binary value of the leading two binary characters of each of said series.

3. In a computer including an element having a preselected pattern of binary characters recorded thereon, said preselected pattern comprising a plurality of binary characters of different kinds arranged in different tracks to represent different values of each order, at least the track for the lowest order having a plurality of binary characters arranged to include a unique series of successive binary characters beginning with a binary character of one kind and ending with a binary character of the other kind and with the first and last of said binary characters of each series changing in opposite directions in progressing between successive values, means for sensing preselected portions of the pattern of binary characters in each of said tracks and providing an electrical indication corresponding to the sensed binary character, means for producing relative movement between said element and said sensing means in accordance with a signal to be encoded, and means for electrically indicating the value of the sensed decimal digit in each track including means responsive to the electrical indications for the track representative of the lowest order to coincidentaliy detect the opposite binary values of the leading two binary characters of each of said series representative of a single value.

4. A shaft position digitizer as defined in claim 3 wherein the means for coincidentally determining the opposite binary values includes a "NOR" circuit having two input terminals for each decimal digit.

5. A shaft position digitizer including an element having a preselected pattern of binary characters recorded thereon, said preselected pattern comprising ten conductive and nonconductive segments arranged in different tracks to represent different values for each order, brush means for engaging and sensing preselected portions of the pattern of segments in each of said tracks and providing an electrical indication corresponding to the sensed binary characters, means for producing relative movement between said element and said sensing means in accordance with the positions of a shaft to be digitized, at least the track corresponding to the lowest order having a plurality of segments arranged relative to the brush means whereby the brushes provide a unique series of successive electrical binary characters beginning with a binary character of one kind and ending with a binary character of the other kind and with the first and last of said binary characters of each series changing in opposite directions in progressing between values, and translating means for indicating the value corresponding to the segments sensed in each track, said translating means including means simultaneously responsive to the last of said electrical binary characters of the unique series and the adjacent electrical binary character characteristic of the values.

6. A shaft position digitizer including an element having a preselected pattern of binary characters recorded in tracks thereon, means for sensing preselected binary characters in each track, means for producing relative movement between said element and said sensing means in accordance with the position of a shaft to be digitized, said preselected pattern comprising a plurality of binary characters of different kinds arranged in the different tracks for representing the different orders of a preselected number system, at least one of the tracks having a plurality of binary characters arranged relative to the sensing means whereby the latter provides a unique series of successive binary characters beginning with a binary character of one kind and ending with a binary character of the other kind and with the first and last of said binary characters of each series changing in opposite directions in progressing between decimal digits, and means responsive to the sensing means for providing an electrical indication of the value of the sensed portions of the pattern of binary characters for each order, said latter mentioned means including means for determining whether the sensed character for the next higher order represents an odd or even digit and for modifying the sensed patterns for the lower orders to correspond to the defined unique series only if the next higher order is an odd digit.

7. An encoder including an element having a preselected pattern of binary characters recorded in tracks thereon, means for sensing preselected binary characters in each track, means for producing relative movement between said element and said sensing means in accordance with an analog signal to be encoded, said preselected pattern comprising a plurality of binary characters of different kinds arranged to represent different orders, at least the track for the lowest order having seven binary characters arranged relative to the sensing means whereby the latter provides at least one binary character that changes in the same direction from a binary character of one kind to the other kind in progressing between different values of the order, means for determining whether the sensed decimal digit of the next higher order is odd or even, and means for modifying the sensed pattern of the next lower order in accordance with the odd or even determination, and means responsive to preselected characters of the pattern of modified binary characters for indicating the sensed value.

8. An encoder as defined in claim 7 wherein the same preselected group of binary characters represents successive decimal digits in a first and second series, a pair of binary characters defined to identify the preselected group with the first or second series and a value intermediate the two series, and a binary character defining the other extremities of the series.

9. An encoder as defined in claim 8 wherein the first series comprises the counts 1, 2, 3, and 4 and the second series the counts 6, 7, 8, and 9 and the count 5 is intermediate the two series and count zero is at opposite extremities thereof.

10. An encoder as defined in claim 8 wherein the pair of binary characters identifying the first and second series and the binary character defining the said other extremities of the series are modified in accordance with the odd or even determination whereby they remain as sensed if the next higher order is even or are complemented if the next higher order is odd.

References Cited in the file of this patent
UNITED STATES PATENTS

| | | |
|---|---|---|
| 2,436,178 | Rajchman | Feb. 17, 1948 |
| 2,533,242 | Gridley | Feb. 17, 1948 |
| 2,659,072 | Coales | Nov. 10, 1953 |
| 2,679,644 | Lippel | May 25, 1954 |
| 2,685,054 | Brenner | July 27, 1954 |
| 2,685,082 | Beman et al. | July 27, 1954 |
| 2,977,582 | Wolman | Mar. 28, 1961 |
| 3,003,142 | Wolinsky | Oct. 3, 1961 |
| 3,024,990 | Magnuson | Mar. 13, 1962 |